(12) United States Patent
Jo et al.

(10) Patent No.: US 10,031,206 B1
(45) Date of Patent: Jul. 24, 2018

(54) CALIBRATION METHOD OF SENSOR OF A SATELLITE ANTENNA

(71) Applicant: AGENCY FOR DEFENSE DEVELOPMENT, Daejeon (KR)

(72) Inventors: Hyunwook Jo, Gyeongsangbuk-do (KR); Jongwan Heo, Daejeon (KR); Kunsup Kwon, Daejeon (KR); Myungjin Jang, Daejeon (KR)

(73) Assignee: AGENCY FOR DEFENCE DEVELOPMENT (KR)

( * ) Notice: Subject to any disclaimer, the term of this patent is extended or adjusted under 35 U.S.C. 154(b) by 0 days.

(21) Appl. No.: 15/671,377

(22) Filed: Aug. 8, 2017

(51) Int. Cl.
| | | |
|---|---|---|
| *H01Q 3/08* | (2006.01) | |
| *G01S 3/00* | (2006.01) | |
| *G01S 3/02* | (2006.01) | |
| *G01S 19/31* | (2010.01) | |
| *H01Q 1/42* | (2006.01) | |

(52) U.S. Cl.
CPC .............. *G01S 3/023* (2013.01); *G01S 19/31* (2013.01); *H01Q 1/428* (2013.01)

(58) Field of Classification Search
CPC ............ H01Q 3/08; H01Q 1/125; H01Q 3/04; H01Q 3/005; H01Q 1/28; H01Q 1/288; H01Q 3/00; G01S 3/00; G01S 3/023; G01S 19/31
See application file for complete search history.

(56) References Cited

U.S. PATENT DOCUMENTS

| | | | | |
|---|---|---|---|---|
| 4,035,805 A | * | 7/1977 | Mobley | ..................... G01S 3/44 |
| | | | | 318/649 |
| 6,999,036 B2 | * | 2/2006 | Stoyanov | ............. H01Q 1/1264 |
| | | | | 343/757 |
| 7,893,885 B2 | * | 2/2011 | Jung | ........................ H01Q 3/08 |
| | | | | 343/757 |

(Continued)

FOREIGN PATENT DOCUMENTS

| | | |
|---|---|---|
| JP | 5992804 B2 | 9/2016 |
| KR | 100603620 B1 | 7/2006 |

(Continued)

OTHER PUBLICATIONS

Jun. 21, 2017 Notice of Allowance of KR10-2016-0058851.
Feb. 13, 2017 Office Action of KR10-2016-0058851.

*Primary Examiner* — Tho G Phan
(74) *Attorney, Agent, or Firm* — Ostrolenk Faber LLP

(57) ABSTRACT

A method for calibrating an orientation angle of a rotatable satellite tracking antenna, while changing an elevation angle or an azimuth, includes an elevation encoder calibrating step of setting a value of an elevation encoder measuring an elevation angle of the satellite tracking antenna to zero when an orientation direction of the satellite tracking antenna is parallel to one surface, an azimuth encoder calibrating step of setting a value of an azimuth encoder measuring an azimuth of the satellite tracking antenna to zero when an orientation direction of the satellite tracking antenna is parallel to one direction, and a gyroscope calibrating step of (Continued)

performing calibration such that one axis included in a gyroscope measuring a rotation angular velocity of the satellite tracking antenna is parallel to an azimuth rotation axis of the satellite tracking antenna and the other is parallel to an elevation rotation axis of the satellite tracking antenna.

7 Claims, 7 Drawing Sheets

(56) References Cited

U.S. PATENT DOCUMENTS

| | | | | |
|---|---|---|---|---|
| 8,174,456 B2* | 5/2012 | Omori | ................. | G01S 3/42 |
| | | | | 343/766 |
| 8,314,735 B2* | 11/2012 | Park | ................. | H01Q 3/08 |
| | | | | 342/357.63 |
| 2007/0103366 A1* | 5/2007 | Park | ................. | G01S 3/42 |
| | | | | 342/359 |

FOREIGN PATENT DOCUMENTS

| | | |
|---|---|---|
| KR | 100798129 B1 | 2/2008 |
| KR | 100857536 B1 | 9/2008 |
| KR | 101529979 B1 | 6/2015 |

* cited by examiner

US 10,031,206 B1

CALIBRATION METHOD OF SENSOR OF A SATELLITE ANTENNA

BACKGROUND OF THE INVENTION

1. Field of the Invention

The present disclosure relates to a method for calibrating (aligning) a sensor used for every antenna having a tracking function regarding a satellite to communicate with the satellite to enhance performance of tracking and stabilization of the sensor.

2. Background of the Invention

A satellite tracking antenna is required to accurately track a signal of a satellite to wirelessly communicate with the satellite. To this end, the satellite tracking antenna is installed to be connected to a motor, and the motor is driven using a tracking and stabilization algorithm.

The tracking and stabilization algorithm serves to accurately position the satellite tracking antenna in a direction in which the satellite tracking antenna is to be oriented. In detail, a tracking algorithm calculates a direction in which the antenna is to be oriented (direction corresponding to a position of the satellite). Also, a stabilization algorithm drives the motor to turn the antenna such that a difference between the direction, in which the antenna is oriented, calculated by the tracking and stabilization algorithm and a direction in which the antenna is actually oriented is 0.

In order to detect an orientation direction and an angle of the antenna, a gyroscope and an encoder, sensors for implementing a tracking and stabilization algorithm of a 2-axis antenna in which two rotation axes are connected to be perpendicular to each other and an azimuth rotation angle is vertically connected t a platform, are widely used.

The encoder provides information about a rotation angle of the antenna motor with respect to an arbitrarily determined reference. The encoder may be divided into an elevation encoder measuring a direction of an elevation angle and an azimuth encoder measuring a direction of an azimuth angle.

Also, since the gyroscope provides information regarding a rotational angular velocity of an inertial coordinate system reference, a rotation angle may be known by integrating the rotational angular velocity.

Since the tracking and stabilization algorithm tracks an actual physical target, an orientation angle and direction calculated through the tracking and stabilization algorithm should be determined on the basis of the physical target. Also, an angle indicated by the sensor is required to be the same as an angle calculated through the tracking and stabilization algorithm. Here, the physical target may be in a direction parallel to an antenna mounting surface of a platform at the center of an antenna horn. Also, the direction parallel to the antenna mounting surface of the platform at the center of the horn may be a direction in which in which an elevation angle is 0° in the tracking and stabilization algorithm. Here, the platform may be a place or a device where the satellite tracking antenna is installed.

FIG. 1 is a conceptual view illustrating an error occurring between an angle indicated by each sensor of the satellite tracking antenna installed on the platform and an angle calculated using the tracking and stabilization algorithm.

When the elevation encoder of the satellite tracking antenna indicates 0°, if a direction indicated by the satellite tracking antenna is different from a direction indicated by an elevation angle 0° calculated through the tracking and stabilization algorithm, such an error as illustrated in FIG. 1 occurs.

FIG. 2 is a block diagram illustrating a tracking and stabilization system of a satellite tracking antenna.

The tracking and stabilization system has a problem that an error occurs between an angle calculated and indicated by the tracking and stabilization algorithm and an angle indicated by the encoder and gyroscope sensors in an actually tracking stage, no matter how accurate the tracking and stabilization algorithm is.

In particular, in cases where high tracking accuracy is required, such an error is required to be minimized. For example, if required tracking accuracy is 0.1°, an error between the angle calculated and indicated by the tracking and stabilization algorithm and the angle indicated by the encoder and gyroscope sensors should be smaller than 0.1°.

In order to calibrate such a small angle error, a mechanically calibrating method or software-wise calibrating method may be used. Here, the mechanically calibrating method requires an additional elaborate measurement device, and, generally, provision of such a measurement device inevitably incurs high cost.

Thus, a simple method for accurately performing calibration without incurring additional cost is required.

SUMMARY OF THE INVENTION

Therefore, an aspect of the detailed description is to provide a calibration method for adjusting a direction and an angle indicated by each sensor of a 2-axis satellite tracking antenna including an azimuth motor and an elevation motor to be the same as a direction and an angle calculated and indicated by a tracking and stabilization algorithm of the satellite tracking antenna.

Another aspect of the detailed description is to provide a method for aligning directions and angles indicated by an elevation encoder and an azimuth encoder of a satellite tracking antenna to a direction and an angle obtained by a gyroscope of the satellite tracking antenna.

To achieve these and other advantages and in accordance with the purpose of this specification, as embodied and broadly described herein, a method for calibrating an orientation angle of a satellite tracking antenna which is rotatable, while changing an elevation angle or an azimuth, includes: an elevation encoder calibrating step of setting a value of an elevation encoder measuring an elevation angle of the satellite tracking antenna to zero (0) when an orientation direction of the satellite tracking antenna is parallel to one surface; an azimuth encoder calibrating step of setting a value of an azimuth encoder measuring an azimuth of the satellite tracking antenna to zero (0) when an orientation direction of the satellite tracking antenna is parallel to one direction; and a gyroscope calibrating step of performing calibration such that one of multiple axes included in a gyroscope measuring a rotation angular velocity of the satellite tracking antenna is parallel to an azimuth rotation axis of the satellite tracking antenna and the other axis among the multiple axes is parallel to an elevation rotation axis of the satellite tracking antenna.

The elevation encoder calibrating step may include: a first step of positioning the satellite tracking antenna to a position where strength of a satellite reception signal is maximized and measuring a value of the elevation encoder; a second step of fixing an elevation angle and rotating an azimuth such that the satellite tracking antenna faces in the opposite direction; a third step of fixing the azimuth, rotating and positioning the satellite tracking antenna such that an elevation angle is changed to a position where strength of a satellite reception signal is maximized, and measuring a variation of a value of the elevation encoder; and a fourth step of calibrating the elevation encoder using the value of the elevation encoder measured in the first step and the variation of the value of the elevation encoder measured in the third step.

In the fourth step, the value of the elevation encoder measured in the first step and the variation of the value of the elevation encoder measured in the third step may be $\theta_1$ and $\theta_2$, respectively, and an elevation calibration value for calibrating the elevation encoder may be calculated using $\theta_1$ and $\theta_2$ to calibrate the elevation encoder by the calculated elevation calibration value.

In the fourth step, the elevation calibration value for calibrating the elevation encoder may be calculated using an equation of $\theta_2/2+\theta_1-90$.

The azimuth encoder calibrating step may include: a first step of positioning the satellite tracking antenna to a position where strength of a satellite reception signal is maximized and measuring a value of the azimuth encoder; a second step of moving the satellite tracking antenna to a position where a value of the elevation encoder is 0, fixing an elevation angle, and rotating only an azimuth of the satellite tracking antenna to a position where a value of the azimuth encoder is 0; a third step of fixing the azimuth and rotating only an elevation angle of the satellite tracking antenna such that the satellite tracking antenna faces in the opposite direction; a fourth step of fixing the elevation angle, positioning the satellite tracking antenna to a position where strength of a satellite reception signal of the satellite tracking antenna is maximized, and measuring a variation of a value of the azimuth encoder; and a fifth step of calibrating the azimuth encoder using the value of the azimuth encoder in the first step and the variation of the value of the azimuth encoder in the fourth step.

In the fifth step, the value of the azimuth encoder measured in the first step and the variation of the value of the azimuth encoder measured in the fourth step may be $\theta_3$ and $\theta_4$, respectively, and an azimuth calibration value for calibrating the azimuth encoder may be calculated using $\theta_3$ and $\theta_4$ to calibrate the azimuth encoder by the calculated elevation calibration value.

In the fifth step, the azimuth calibration value for calibrating the azimuth encoder may be calculated using an equation of $(\theta_4+\theta_3)/2-90$.

The gyroscope calibrating step may include: a first step of positioning the gyroscope such that one of multiple axes included in the gyroscope is parallel to the azimuth rotation axis when the value of the elevation encoder is 0; and a second step of positioning the gyroscope such that the other axis among the multiple axes included in the gyroscope is parallel to the elevation rotation axis when the value of the azimuth encoder is 0.

According to the present disclosure, the calibration method for adjusting a direction and an angle calculated and indicated by a tracking and stabilization algorithm in a 2-axis satellite tracking antenna including an azimuth motor and an elevation motor to be the same as a direction and an angle indicated by each sensor of the satellite tracking antenna may be provided.

According to the present disclosure, the method for aligning a direction and an angle obtained by a gyroscope of a satellite tracking antenna to a direction and an angle indicated by an elevation encoder and an azimuth encoder may be provided.

According to the present disclosure, since angles of sensors provided in the satellite tracking antenna are calibrated by software, a separate mechanical device or tool for calibrating angles of the sensors is not required, reducing cost.

According to the present disclosure, since the encoder and the gyroscope included in the satellite tracking antenna can be calibrated with accuracy of resolution required for the satellite tracking antenna, sensors may be precisely calibrated.

Further scope of applicability of the present application will become more apparent from the detailed description given hereinafter. However, it should b+e understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
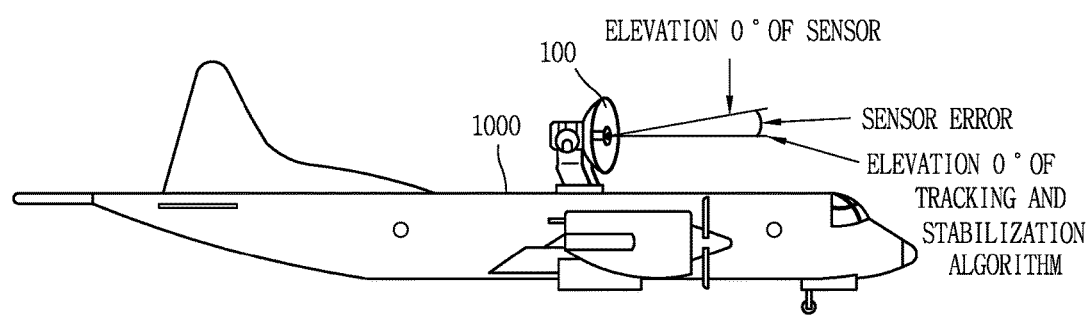
FIG. 1 is a conceptual view illustrating an error occurring between an angle indicated by each sensor of a satellite tracking antenna according to the present disclosure installed above a platform and an angle calculated using a tracking and stabilization algorithm.
Figure 2:
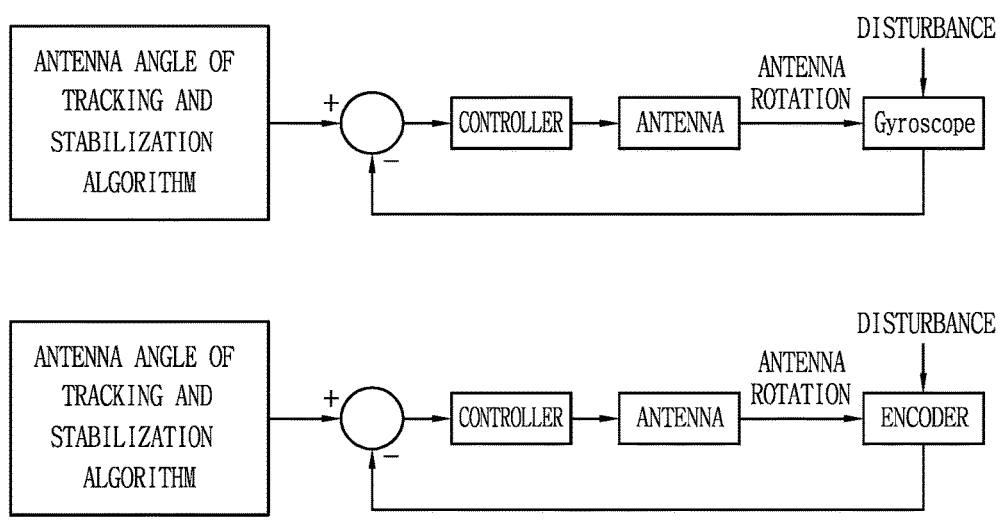
FIG. 2 is a block diagram of a tracking and stabilization system of a satellite tracking antenna according to the present disclosure.

Hereinafter, a method for calibrating an orientation angle of a satellite tracking antenna 100 of the present disclosure will be described with reference to the accompanying drawings.

Like numbers refer to like elements throughout although the embodiments are different.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

It should be appreciated that terms or words used in the specification and claims should not be limited and construed as common or dictionary meanings, and should be construed as meanings and concepts according to the technical spirit of the present disclosure.

Hereinafter, the present invention will be described in detail according to specific examples, but the following examples are merely presented to exemplify the present invention. It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

An angle sensor calibrating method for enhancing accuracy of satellite tracking and stabilization of a satellite tracking antenna 100 system according to an embodiment of the present disclosure may include calibration methods regarding each of sensors including an elevation encoder, an azimuth encoder, and a gyroscope adhered to a rear side of an antenna reflector.

In the following descriptions, the elevation encoder is calibrated, the azimuth encoder is subsequently calibrated, and the gyroscope is finally calibrated, but the present disclosure is not limited thereto and calibration may be performed in different order.

For example, a method of first calibrating the azimuth encoder and subsequently calibrating the elevation encoder may also be considered.

First, according to the method of calibrating the elevation encoder, a direction in which an elevation angle is determined to be 0° through calculation of a tracking and stabilization algorithm, that is, a direction parallel to a plane surface of a platform 1000, is determined and calibration is performed by adjusting the direction in which the elevation encoder indicates 0° to the direction in which the elevation angle is determined to be 0° by the algorithm.

Next, according to the method of calibrating the azimuth encoder, a direction in which an azimuth is determined to be 0° through calculation of the tracking and stabilization algorithm, that is, a height direction (head direction) of the platform 1000, is determined, and calibration is performed by adjusting the direction in which the azimuth encoder indicates 0° to the direction in which the azimuth is determined to be 0° by the algorithm.

Finally, according to the method of calibrating the gyroscope, any one of a plurality of axes included in the gyroscope is aligned to be parallel to rotation axis of an elevation motor, i.e., an elevation rotation axis 110 and another axis of the plurality of axis included in the gyroscope is aligned to be parallel to a rotation axis of the azimuth motor, i.e., an azimuth rotation axis 120.

Aforementioned subjects, advantages and features of the present invention and implementation methods thereof will be clarified through following exemplary embodiments described with reference to the accompanying drawings.

The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art, and the present disclosure is defined by the category of claims. The technical terms used in this disclosure are only used to explain a specific exemplary embodiment while not limiting the present invention.

Hereinafter, a method for calibrating the elevation encoder, the azimuth encoder, and the gyroscope according to an embodiment of the present disclosure will be described with reference to FIGS. 1 to 5.

The present invention relates to a method for calibrating an orientation angle of a satellite tracking antenna 100 which is changed in an elevation angle and an azimuth and which is rotatable, and the method includes an elevation encoder calibrating step, an azimuth encoder calibrating step, and a gyroscope calibrating step.

In the elevation encoder calibrating step, when a direction in which the satellite tracking antenna 100 is oriented is parallel to one surface, a value of the elevation encoder measuring an elevation angle of the satellite tracking antenna 100 is 0 (zero).

Here, the one surface may be a plane or one surface of a device on which the satellite tracking antenna 100 is installed.

Also, the direction in which the satellite tracking antenna 100 is oriented may be a direction in which a horn of the satellite tracking antenna 100 faces, that is, a direction to which the horn points.

In the azimuth encoder calibrating step, when a direction in which the satellite tracking antenna 100 is oriented is parallel to one direction, a value of the azimuth encoder measuring an azimuth of the satellite tracking antenna 100 is 0.

Also, in the gyroscope calibrating step, one of a plurality of axes included in the gyroscope measuring a rotational angular velocity of the satellite tracking antenna 100 is calibrated to be parallel to an azimuth rotation axis of the satellite tracking antenna 100 and the other axis is calibrated to be parallel to an elevation rotation axis of the satellite tracking antenna 100.

Hereinafter, the elevation encoder calibrating method will be described in detail.

The elevation encoder is calibrated when the platform 1000 is stationary.

AS described above, the platform 1000 may refer to a device or a place where the satellite tracking antenna 100 is installed.

Figure 4:
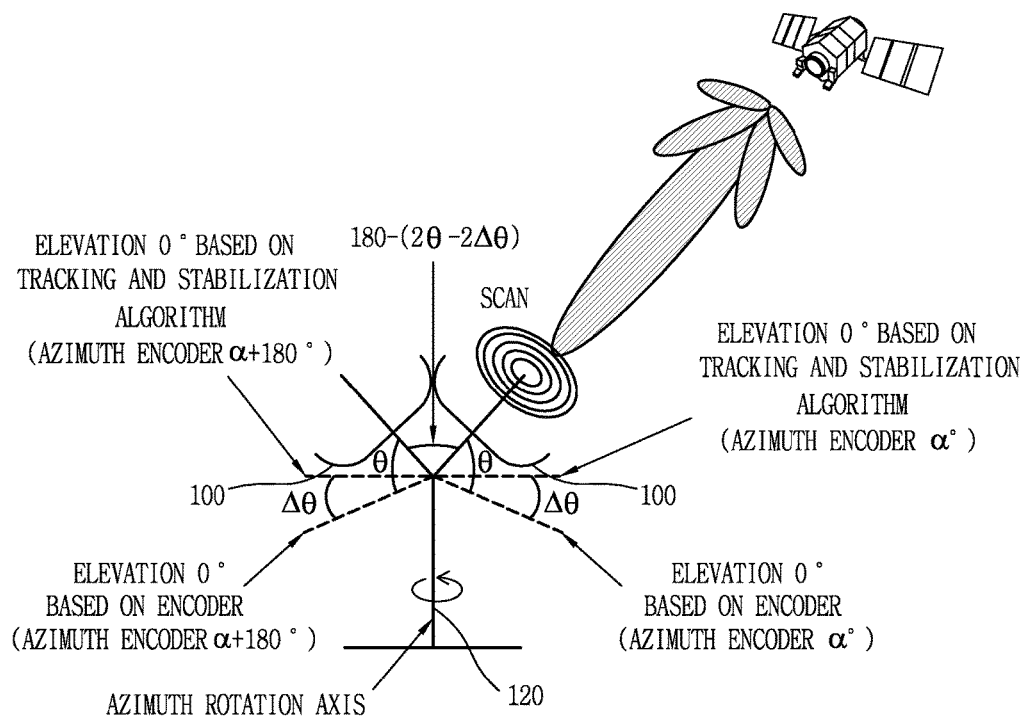
FIG. 4 is a conceptual view illustrating an elevation encoder calibrating method for adjusting an elevation angle value indicated by an elevation encoder and an elevation angle value calculated by a tracking and stabilization algorithm to be equal to each other according to the present disclosure.
Figure 5A:
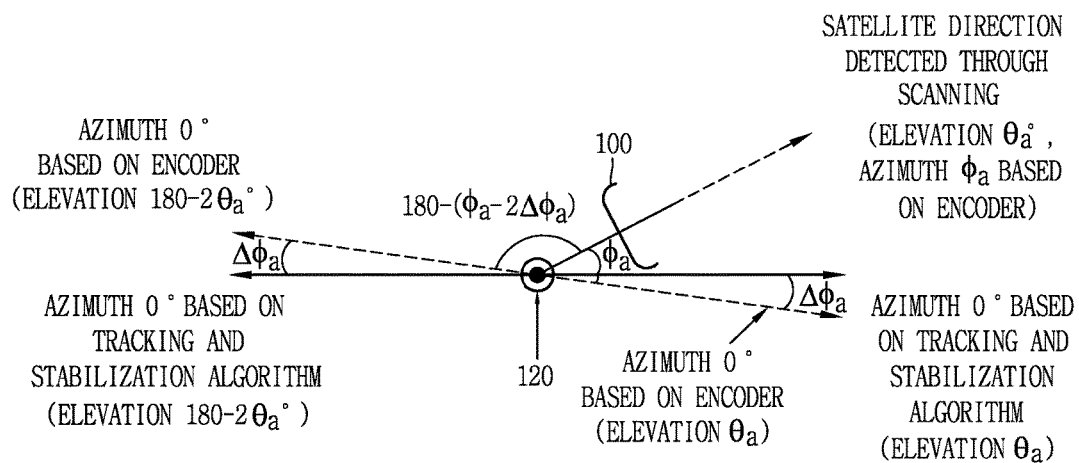
FIGS. 5A to 5D are conceptual views illustrating an azimuth encoder calibrating method for adjusting an azimuth value indicated by an azimuth encoder and an azimuth value calculated by a tracking and stabilization algorithm to be equal to each other, on the basis of an azimuth rotation axis, according to the present disclosure.
Figure 5B:
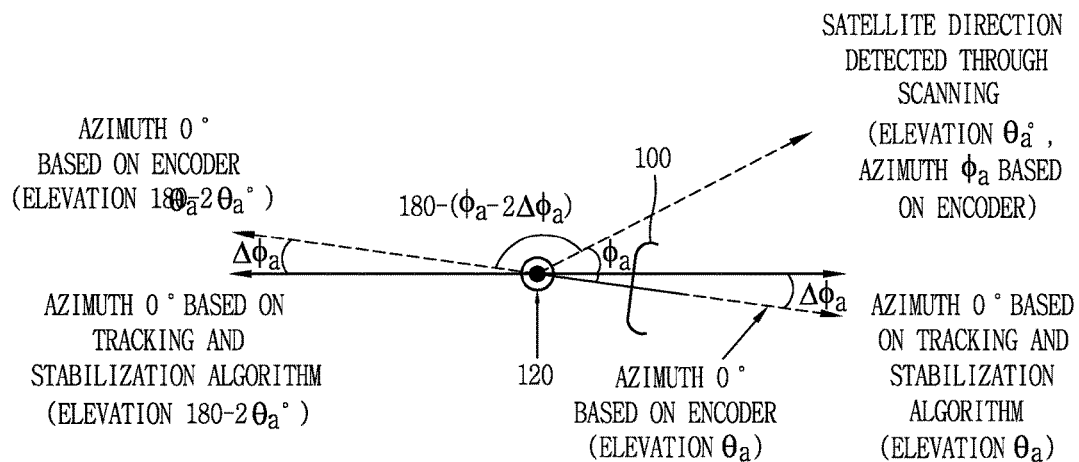
Figure 5C:
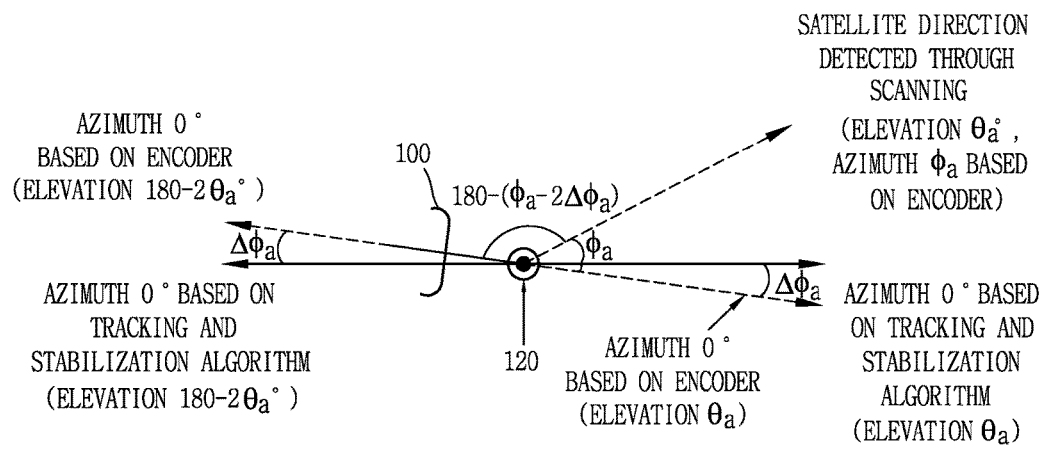
Figure 5D:
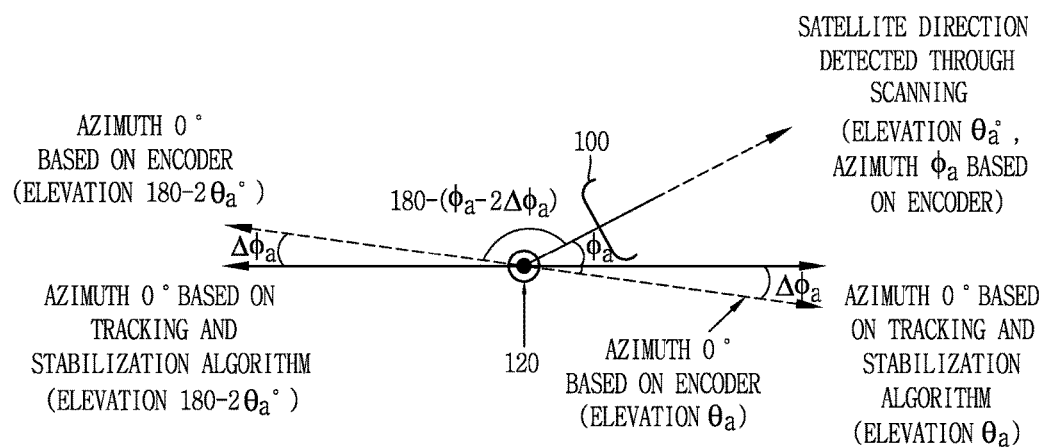
Figure 6:
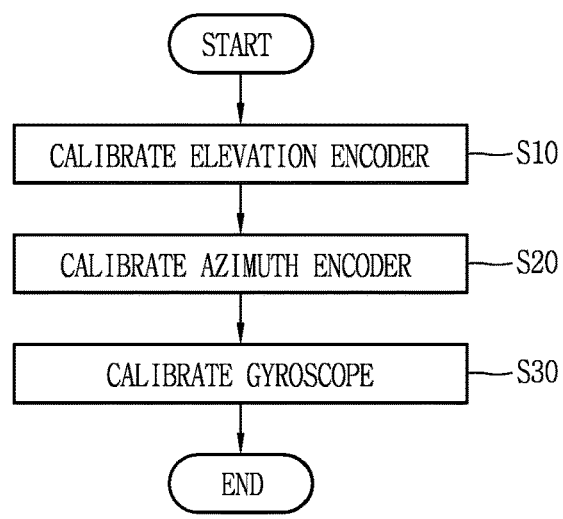
FIG. 6 is a flow chart illustrating a method for calibrating a sensor such as an elevation encoder, an azimuth encoder, a gyroscope, and the like, adhered to a satellite tracking antenna according to the present disclosure.
Figure 7:
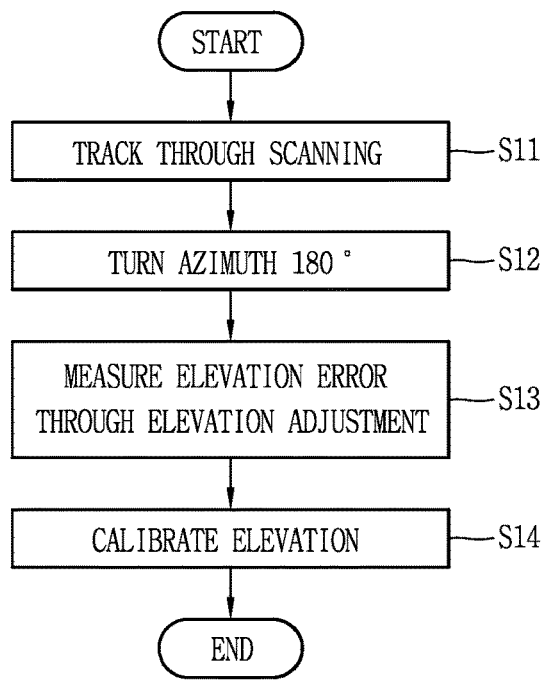
FIG. 7 is a flow chart illustrating a method for calibrating an elevation encoder of a satellite tracking antenna according to the present disclosure.
Figure 8:
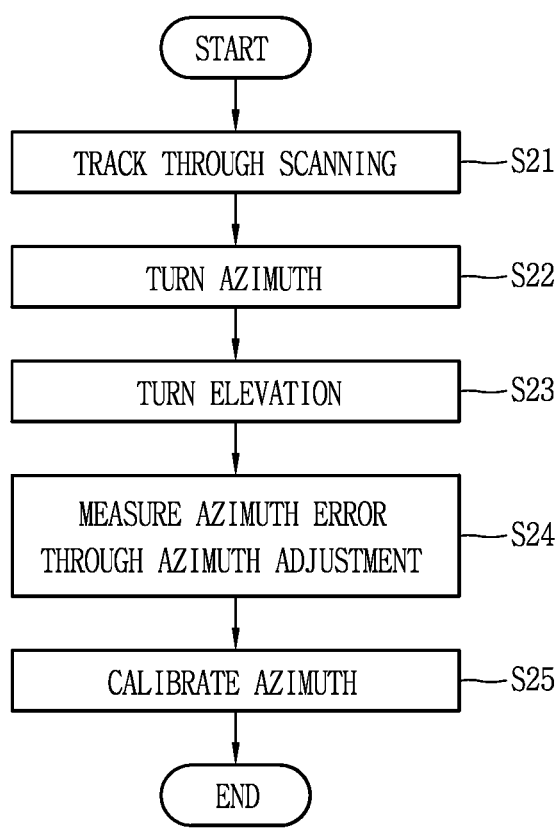
FIG. 8 is a flow chart illustrating a method for calibrating an azimuth encoder of a satellite tracking antenna according to the present disclosure.
Figure 9:
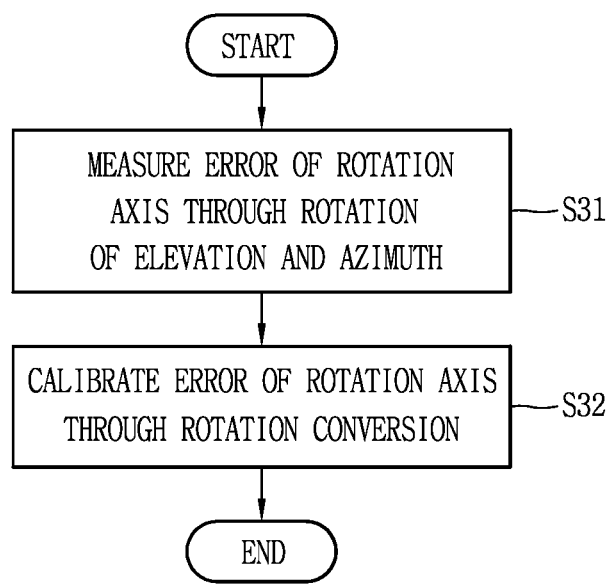
FIG. 9 is a flow chart illustrating a method for calibrating a gyroscope of a satellite tracking antenna according to the present disclosure.

FIG. 4 is a conceptual view illustrating an elevation encoder calibrating method for aligning an elevation angle value indicated by an elevation encoder and an elevation angle value calculated by a tracking and stabilization algorithm, according to the present disclosure.

Referring to FIG. 4, it can be seen that there is an error (Δθ) between an elevation angle indicated by the elevation encoder and an elevation angle calculated by the tracking and stabilization algorithm.

Scanning refers to recognizing strength of a satellite reception signal, while rotating an azimuth motor and an elevation motor of the satellite tracking antenna 100.

When the azimuth encoder indicates a specific azimuth ($\alpha$) and the elevation encoder indicates a specific elevation angle ($\theta$), a satellite signal recognized through scanning may be maximized.

As illustrated in FIG. 4, it is assumed that a difference between the elevation angle indicated by the elevation encoder and the elevation angle calculated by the tracking and stabilization algorithm is $\Delta\theta$.

When an azimuth of the satellite tracking antenna 100 is rotated by 180° in a direction in which strength of a satellite reception signal is maximized, the azimuth of the azimuth encoder is $\alpha+180°$ and an elevation angle of the elevation encoder is 8.

Then, the difference in the elevation angle from the point where strength of the satellite reception signal may be expressed by Equation 1 below.

$$180-(2\theta-2\Delta\theta) \qquad \text{[Equation 1]}$$

Here, the elevation angle of the satellite tracking antenna 100 is rotated until the satellite reception signal is maximized, and an elevation rotation amount at that time is assumed to be $\theta_{el}$.

$$\theta_{el}=180-(2\theta-2\Delta\theta) \qquad \text{[Equation 2]}$$

$\theta_{el}$ may be expressed by Equation 2. Here, since $\theta_{el}$ and $\theta$ are already known values, Equation 3 may be expressed as follows.

$$\Delta\theta=\theta_{el}/2+\theta-90 \qquad \text{[Equation 3]}$$

In this manner, the elevation angle value used in the tracking and stabilization algorithm and the elevation angle value obtained by the encoder may be the same by using a value obtained by subtracting the calculated value $\Delta\theta$ from the angle of the elevation encoder, as an elevation angle value of the calibrated elevation encoder. In this manner, the elevation encoder may be calibrated.

It is assumed that the elevation encoder of the satellite tracking antenna 100 of the present disclosure is calibrated in the manner described above.

Then, the value of the elevation angle of the elevation encoder and the value of the elevation angle calculated by the tracking and stabilization algorithm may be the same. Thus, hereinafter, an elevation angle may be used as having the same meaning as the elevation angle of the encoder and an elevation angle of a tracking and stabilization command.

Hereinafter, a method for calibrating the azimuth encoder of the satellite tracking antenna 100 according to an embodiment of the present disclosure will be described.

It is assumed that a satellite reception signal is maximized when the elevation angle value of the elevation encoder is $\theta_a$ and the azimuth value of the azimuth encoder is $\phi_a$.

FIGS. 5A to 5D are conceptual views illustrating an azimuth encoder calibrating method for aligning an azimuth value indicated by an azimuth encoder and an azimuth value calculated by a tracking and stabilization algorithm, which is based on an azimuth rotation axis, according to the present disclosure.

Referring to FIGS. 5A to 5D, it is assumed that a difference between an azimuth indicated by the azimuth encoder and an azimuth of the tracking and stabilization algorithm is $\Delta\phi_a$.

In this context, after the azimuth of the azimuth encoder is rotated to a point of 0°, while maintaining the elevation angle of the satellite tracking antenna 100, the elevation angle is rotated such that the elevation encoder indicates $180-2\beta_a$. A difference between the point where the satellite reception signal of the satellite tracking antenna 100 is maximized and the azimuth at the point where the azimuth encoder is 0° can be expressed by Equation 4 below.

$$180-(\phi_a-2\Delta\phi_a) \qquad \text{[Equation 4]}$$

The azimuth of the satellite tracking antenna 100 is rotated from the point where the azimuth encoder is 0° until the satellite reception signal is maximized and a corresponding azimuth rotation amount by that time is assumed to be $\phi_{a\;cor}$.

Then, Equation 5 below can be expressed.

$$\phi_{a_{cor}}=180-(\phi_a-2\Delta\phi_a) \qquad \text{[Equation 5]}$$

Here, $\phi_a$ and $\phi_{a\;cor}$ are known values. Thus, Equation 6 below can be expressed.

$$\Delta\phi_a = \frac{\phi_{a_{cor}}+\delta_a}{2}-90 \qquad \text{[Equation 6]}$$

Since the value obtained by subtracting the calculated $\Delta\phi_a$ from the angle of the azimuth encoder is used as an azimuth value of the calibrated azimuth encoder, the same elevation angle value as that used by the tracking and stabilization algorithm may be obtained. In this manner, an error between the azimuth based on the azimuth encoder and the azimuth based on the tracking and stabilization algorithm may be calibrated.

Hereinafter, a method for calibrating a gyroscope will be described.

The situation in which the elevation angle of the elevation encoder and the azimuth of the azimuth encoder were calibrated as described above is considered.

Since the elevation angle of the elevation encoder and the azimuth of the azimuth encoder are used as a reference with respect to a direction of an actual physical target, a rotation axis of the gyroscope, a rotation axis of the gyroscope is to adjusted to be the same as the azimuth rotation axis of the azimuth encoder and the elevation rotation axis of the elevation encoder.

Since the azimuth rotation axis and the rotation axis of the elevation angle are perpendicular to a direction of the horn of the antenna, the other rotation axis of the gyroscope may be configured to be parallel to the direction of the horn of the antenna.

Figure 3:
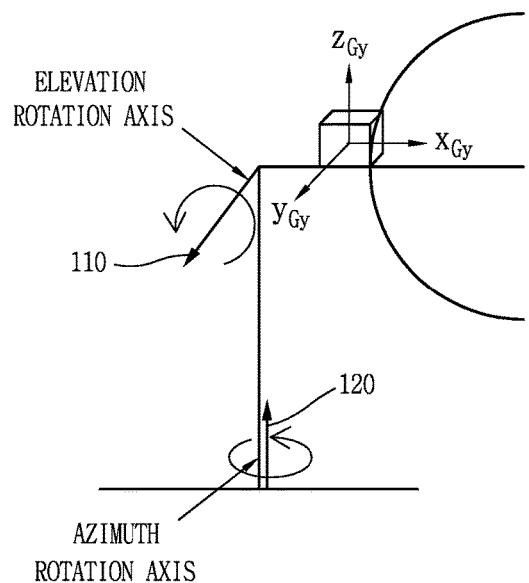
FIG. 3 is a conceptual view illustrating calibration of an elevation rotation axis and an azimuth rotation axis of a satellite tracking antenna and multiple axes included in a gyroscope according to the present disclosure.

FIG. 3 is a conceptual view illustrating calibration of an elevation rotation axis and azimuth rotation axis of the satellite tracking antenna and multiple axes included in a gyroscope according to the present disclosure.

A method for calibrating the gyroscope will be described with reference to FIG. 3.

When an elevation angle of the elevation encoder is 0°, an $z_{Gy}$ axis, one of multiple axes of the gyroscope, may be aligned to be parallel to an axis of a motor azimuth.

Also, an $y_{Gy}$ axis, another axis among the multiple axes of the gyroscope, may be aligned to be parallel to the elevation rotation axis of the elevation motor.

If the $z_{Gy}$ axis, one of the multiple axes of the gyroscope, does not correspond with the azimuth rotation axis of the azimuth motor, a rotation speed based on the $z_{Gy}$ rotation axis measured by the gyroscope may be output to be smaller than the azimuth rotational speed of the motor.

Meanwhile, when the $y_{Gy}$ axis, another axis among the multiple axes of the gyroscope, does not correspond with the elevation rotation axis of the elevation motor, a rotation speed based on the $y_{Gy}$ rotation axis measured by the gyroscope may be output to be smaller than the elevation rotational speed of the motor.

Thus, the azimuth motor and the elevation motor may be sequentially rotated until a $y_{Gy}$ output speed of the gyroscope is equal to the rotation speed of the elevation motor obtained through the elevation encoder and a $z_{Gy}$ output speed of the gyroscope is equal to the rotation speed of the azimuth motor obtained through the azimuth encoder through the rotation of the azimuth motor and the elevation motor.

Here, it is assumed that $\theta_{AZ}$ and $\theta_{EL}$ are rotations of the azimuth motor and the elevation motor, respectively. Then, one rotation axis of the gyroscope may be aligned to be parallel to the elevation encoder axis and the other axis thereof may be aligned to be parallel to an oriented direction of the antenna by applying rotation conversions respectively corresponding to $-\theta_{AZ}$ and $-\theta_{EL}$ to values output from the gyroscope from a relation of Euler angle.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or to equivalents of such metes and bounds are therefore intended to be embraced by the appended claims.

What is claimed is:

1. A method for calibrating an orientation angle of a satellite tracking antenna which is rotatable, while changing an elevation angle or an azimuth, the method comprising:
    an elevation encoder calibrating step of setting a value of said elevation encoder measuring said elevation angle of the satellite tracking antenna to zero (0) when an orientation direction of the satellite tracking antenna is parallel to one surface;
    an azimuth encoder calibrating step of setting a value of said azimuth encoder measuring an azimuth of the satellite tracking antenna to zero (0) when an orientation direction of the satellite tracking antenna is parallel to one direction; and
    a gyroscope calibrating step of performing calibration such that one of multiple axes included in said gyroscope measuring a rotation angular velocity of the satellite tracking antenna is parallel to an azimuth rotation axis of the satellite tracking antenna and the other axis among the multiple axes is parallel to an elevation rotation axis of the satellite tracking antenna,
    wherein the elevation encoder calibrating step includes:
    a first step of positioning the satellite tracking antenna to a position where strength of a satellite reception signal is maximized and measuring a value of the elevation encoder;
    a second step of fixing said elevation angle and rotating an azimuth such that the satellite tracking antenna faces in the opposite direction;
    a third step of fixing the azimuth, rotating and positioning the satellite tracking antenna such that said elevation angle is changed to a position where strength of a satellite reception signal is maximized, and measuring a variation of a value of the elevation encoder; and
    a fourth step of calibrating the elevation encoder using the value of the elevation encoder measured in the first step and the variation of the value of the elevation encoder measured in the third step.

2. The method of claim 1, wherein,
    in the fourth step,
    the value of the elevation encoder measured in the first step and the variation of the value of the elevation encoder measured in the third step are $\theta_1$ and $\theta_2$, respectively, and
    an elevation calibration value for calibrating the elevation encoder is calculated using $\theta_1$ and $\theta_2$ to calibrate the elevation encoder by the calculated elevation calibration value.

3. The method of claim 2, wherein, in the fourth step, the elevation calibration value for calibrating the elevation encoder is calculated using an equation of $\theta_2/2+\theta_1-90$.

4. The method of claim 1, wherein the azimuth encoder calibrating step includes:
    a first step of positioning the satellite tracking antenna to a position where strength of said satellite reception signal is maximized and measuring a value of the azimuth encoder;
    a second step of moving the satellite tracking antenna to a position where a value of the elevation encoder is 0, fixing said elevation angle, and rotating only an azimuth of the satellite tracking antenna to a position where a value of the azimuth encoder is 0;
    a third step of fixing the azimuth and rotating only said elevation angle of the satellite tracking antenna such that the satellite tracking antenna faces in the opposite direction;
    a fourth step of fixing the elevation angle, positioning the satellite tracking antenna to a position where strength of said satellite reception signal of the satellite tracking antenna is maximized, and measuring a variation of a value of the azimuth encoder; and
    a fifth step of calibrating the azimuth encoder using the value of the azimuth encoder in the first step and the variation of the value of the azimuth encoder in the fourth step.

5. The method of claim 4, wherein
    in the fifth step,
    the value of the azimuth encoder measured in the first step and the variation of the value of the azimuth encoder measured in the fourth step are $\theta_3$ and $\theta_4$, respectively, and
    an azimuth calibration value for calibrating the azimuth encoder is calculated using $\theta_3$ and $\theta_4$ to calibrate the azimuth encoder by the calculated elevation calibration value.

6. The method of claim 5, wherein, in the fifth step, the azimuth calibration value for calibrating the azimuth encoder is calculated using an equation of $(\theta_4+\theta_3)/2-90$.

7. The method of claim 1, wherein the gyroscope calibrating step includes:

a first step of positioning the gyroscope such that one of multiple axes included in the gyroscope is parallel to the azimuth rotation axis when the value of the elevation encoder is 0; and a second step of positioning the gyroscope such that the other axis among the multiple axes included in the gyroscope is parallel to the elevation rotation axis when the value of the azimuth encoder is 0.

* * * * *